(12) United States Patent
Cronvall

(10) Patent No.: US 7,897,922 B2
(45) Date of Patent: Mar. 1, 2011

(54) RADIOMETRIC MEASURING OF THIN FLUID FILMS

(75) Inventor: Leif Cronvall, Kivik (SE)

(73) Assignee: MicroFluid AB, Lund (SE)

( * ) Notice: Subject to any disclaimer, the term of this patent is extended or adjusted under 35 U.S.C. 154(b) by 0 days.

(21) Appl. No.: 10/443,026

(22) Filed: May 22, 2003

(65) Prior Publication Data

US 2004/0003739 A1    Jan. 8, 2004

Related U.S. Application Data

(63) Continuation of application No. PCT/SE01/02592, filed on Feb. 22, 2002.

(30) Foreign Application Priority Data

Nov. 24, 2000 (SE) .................................. 0004332

(51) Int. Cl.
*G01J 5/02* (2006.01)
(52) U.S. Cl. ................................ 250/339.11
(58) Field of Classification Search .............. 101/483, 101/484; 250/339.01–339.15, 341.8
See application file for complete search history.

(56) References Cited

U.S. PATENT DOCUMENTS 3,835,777 A * 9/1974 Krygeris .................. 101/350.4
4,129,781 A * 12/1978 Doyle ....................... 250/341.3
4,660,980 A * 4/1987 Takabayashi et al. ....... 356/504
4,677,298 A * 6/1987 Zelmanovic et al. ..... 250/341.8
5,761,999 A  6/1998 Lippold
5,783,836 A  7/1998 Liu et al.
6,832,550 B2 * 12/2004 Martin et al. ............ 101/349.1

FOREIGN PATENT DOCUMENTS

| DE | 3113674 | 10/1982 |
|---|---|---|
| DE | 3113674 A1 | 10/1982 |
| GB | 1330886 | 9/1973 |
| GB | 1566398 | 4/1980 |
| GB | 2254917 | 10/1992 |
| JP | 57-179608 | 11/1982 |
| JP | 57-182622 | 11/1982 |
| JP | 57179608 | 11/1982 |
| JP | 57182622 | 11/1982 |
| JP | 5187822 | 7/1993 |
| JP | 8184560 | 7/1996 |

\* cited by examiner

*Primary Examiner*—David P Porta
*Assistant Examiner*—Kiho Kim
(74) *Attorney, Agent, or Firm*—Capitol City TechLaw

(57) ABSTRACT

The present invention relates to radiometric measurement of a thin fluid film using absorption of IR radiation. At least one IR radiator is directed to send signals to an IR detector via a bed on which the fluid film is placed. The IR detector is set to receive IR radiation in a band around a characteristic absorption band of the fluid of the fluid film. The invention is developed for printing presses, where the thickness of fountain solution on the printing plate and the proportion of printing ink in an emulsion of printing ink and fountain solution may be controlled.

15 Claims, 2 Drawing Sheets

RADIOMETRIC MEASURING OF THIN FLUID FILMS

CROSS REFERENCE TO RELATED APPLICATION

This application is a continuation application of International Application No. PCT/SE01/02592, which was filed Nov. 23, 2001, and which was published in English.

TECHNICAL FIELD

The present invention concerns radiometric measurement of thin fluid films, using absorption of IR radiation.

BACKGROUND OF THE INVENTION

It is known that different substrates absorb different, specific bands of IR (infrared) radiation. Thus, by directing IR radiation towards a thin film of the substrate it is possible to determine the thickness of the film. By a radiometric analysis it is further possible to determine the proportion of ingredients in the substrate and by continuous monitoring it in possible to establish changes of said proportion. Radiometric analysis is based on the change of energy or absorption of radiation, which in this case has wavelengths within the IR area.

The invention is developed for a printing press but may be used for measurement and control of any thin fluid film. Other applications include but are not limited to: oil films often used in pressing of sheet metal; coatings on paper or metal; and photographic films on substrates within the semiconductor industry.

In a printing press, especially but not exclusively an offset printing press, printing ink is to be supplied to the printing areas of the printing plates, whereas all other areas of the printing plates are to be covered by fountain solution during the entire printing process. The fountain solution is normally a water-based solution. Due to different surface conditions on the printing plates the printing ink and the fountain solution will only adhere to the intended areas. Thus, the printing plates have printing areas and non-printing areas In the printing areas there will be a thin film of an emulsion of fountain solution and printing ink. In the non-printing areas there will be a thin film of fountain solution, which also may include a small portion of ink pigments.

The supply of printing ink is performed by means of inking units (one unit per colour), whereas fountain solution is normally supplied by means of a spray bar or other equivalent device, with a length corresponding to the width of the printing press or the length of the printing cylinder. The spray bar usually contains spray nozzles, but other supply means are also possible. From the spray bar the fountain solution is normally transferred to the printing plates by means of one or more form rollers.

The provided amount of fountain solution and printing ink is normally set to values predetermined for the actual printing situation. However, it is also controlled by the printer, who by an experienced eye supervises the printing plates and sees to it that proper amounts are supplied. However, this manual control lacks proper accuracy and cannot cope with rapid changes in the conditions. Accordingly, the printing result will not be optimal, even if the printer is extremely experienced. It is also common to have a density meter for control of the printing quality.

THE INVENTION

The method and device of the invention is based on absorption of radiation having wavelengths within the IR area, using the main or other absorption bands of a fluid to be measured and using the change of energy when the radiation passes through a thin fluid film.

A further important condition is that the object on which the fluid film is received reflects a major part of the radiation in the selected wavelength range.

One object of the present invention is to be able to continuously monitor the thickness of a thin fluid film. The measurements are presented in real time or after being processed.

Another object of the present invention is to monitor the proportion of ingredients in the fluid film in real time or after subsequent processing of the received measurement signals.

A further object of the present invention is to optimise the printing result of printing presses. This is done by optimising both the amounts of fountain solution and the proportion between printing ink and fountain solution in the emulsion in order to obtain the desired density in the printed area on the paper.

The above objects are achieved with a method and a device according to the present invention. The method is radiometric measurement of thin fluid films using absorption of IR radiation. At least one IR radiator is directed to send signals to a connected IR detector by means of the fluid film to be measured. The method is used for a printing press. Thus, the fluid film consists of fountain solution or an emulsion of fountain solution and printing ink, received on a printing plate or other printing equipment. The measurement device is formed of at least one unit comprising the IR radiator and the IR detector, a signal processing system and other support systems. The at least one unit measures on a non-printing area and/or a printing area of the printing plate. A control unit is arranged to receive information from further sensors and meters.

For printing presses the amount of fountain solution and printing ink on the printing plates is monitored and optimised by the invention, which reduce the waste of fountain solution and printing ink. As the printing is optimised and constantly controlled regarding fountain solution and printing ink there will be less waste of paper and printing ink. Less waste of paper and printing ink leads to less negative environmental influence.

One problem that may occur during printing is toning, which is well known in the art of printing. As used in this description the expression "toning" stands for that the contrast between the printed and non-printed areas deteriorates. Toning may occur if excessive amount of fountain solution is received in printing areas. It may also occur if ink is received in non-printing areas. Toning is often due to the fact that either too much or too little fountain solution is delivered. If ink is deposited in non-printing areas it is normally referred to as scumming. Water deposited in the printing areas leads to so-called watermarks and failure of printing areas to accept ink leads to so-called blinding. Thus, it is an object of the present invention to be able to warn against any of the above problems and to correct the supply of fountain solution and possibly the supply of ink before any such problems occur.

Further objects and advantages with the present invention will be obvious for a person skilled in the art when reading the description below of preferred embodiments.

BRIEF DESCRIPTION OF THE DRAWING

The invention will be described further by way of an example and with reference to the enclosed drawings. In the drawings.

DESCRIPTION OF THE PREFERRED EMBODIMENTS

The expression "fluid film" is used in the present description both for a fountain solution (often water-based) and an emulsion of printing ink and fountain solution in connection with printing presses. The fountain solution is received on the non-printing areas of the printing plate or printing surface. The fountain solution is normally an emulsion of water and a few percentages of additives. The fountain solution may also include a small portion of ink pigments when it is received on the printing plate. The emulsion of printing ink and fountain solution is received on the printing areas of the printing plate or surface.

Figure 1:
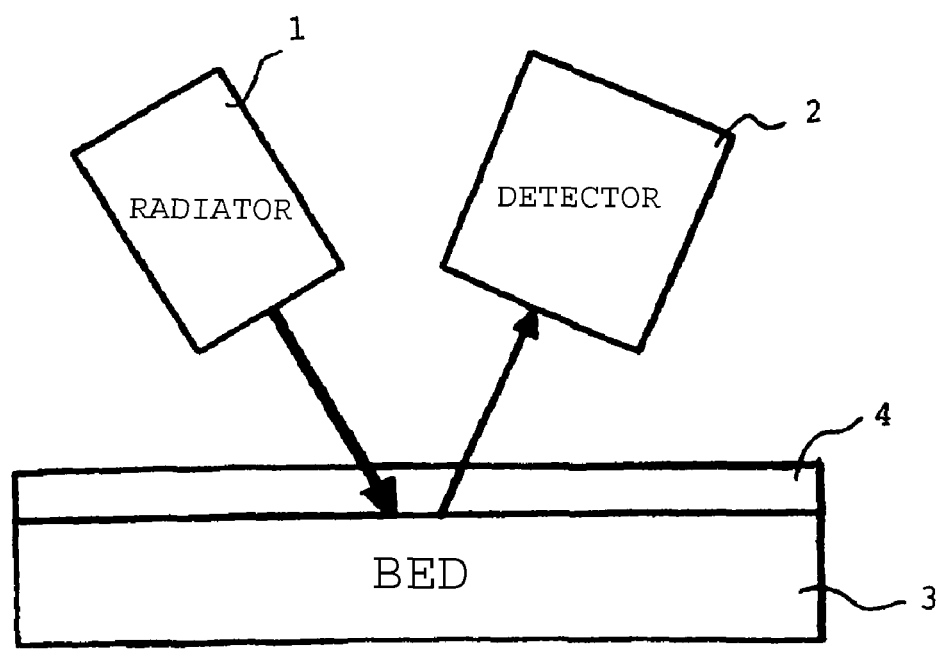
FIG. 1 is a principal illustration of the method of the invention.

In FIG. 1 the principal for the present invention is shown schematically. A thin fluid film 4 is received on a bed 3. For printing presses the bed 3 is a printing plate or other printing equipment. An IR radiator 1 directs IR radiation towards the thin fluid film 4 and an IR receiver or detector 2 receives the IR radiation after passage of the thin fluid film 4. Thus, the bed 3 must reflect a major part of the IR light sent by the radiator 1.

The IR detector 2 normally functions best if the IR light is pulsated. To accomplish this a mechanical device (not shown) may be placed at the radiator 1 or detector 2, which device intermittently blocks the IR radiation. A further example is that the IR radiator 1 is driven in an electrical pulse mode. As devices for pulsating are commonly known to persons skilled in the art they will not be described further here. The present invention may also be used with a continuous IR light.

The IR radiator 1 and IR detector 2 are normally connected to a signal processing unit (not shown) and other support systems (not shown). By means of the signal processing system the absorbed energy of the thin fluid film 4 is calculated. The thickness of the fluid film 4 is monitored continuously.

Furthermore, if the radiator 1 is directed to a printing area the proportion of printing ink in the fluid film 4 may be determined.

Figure 2:
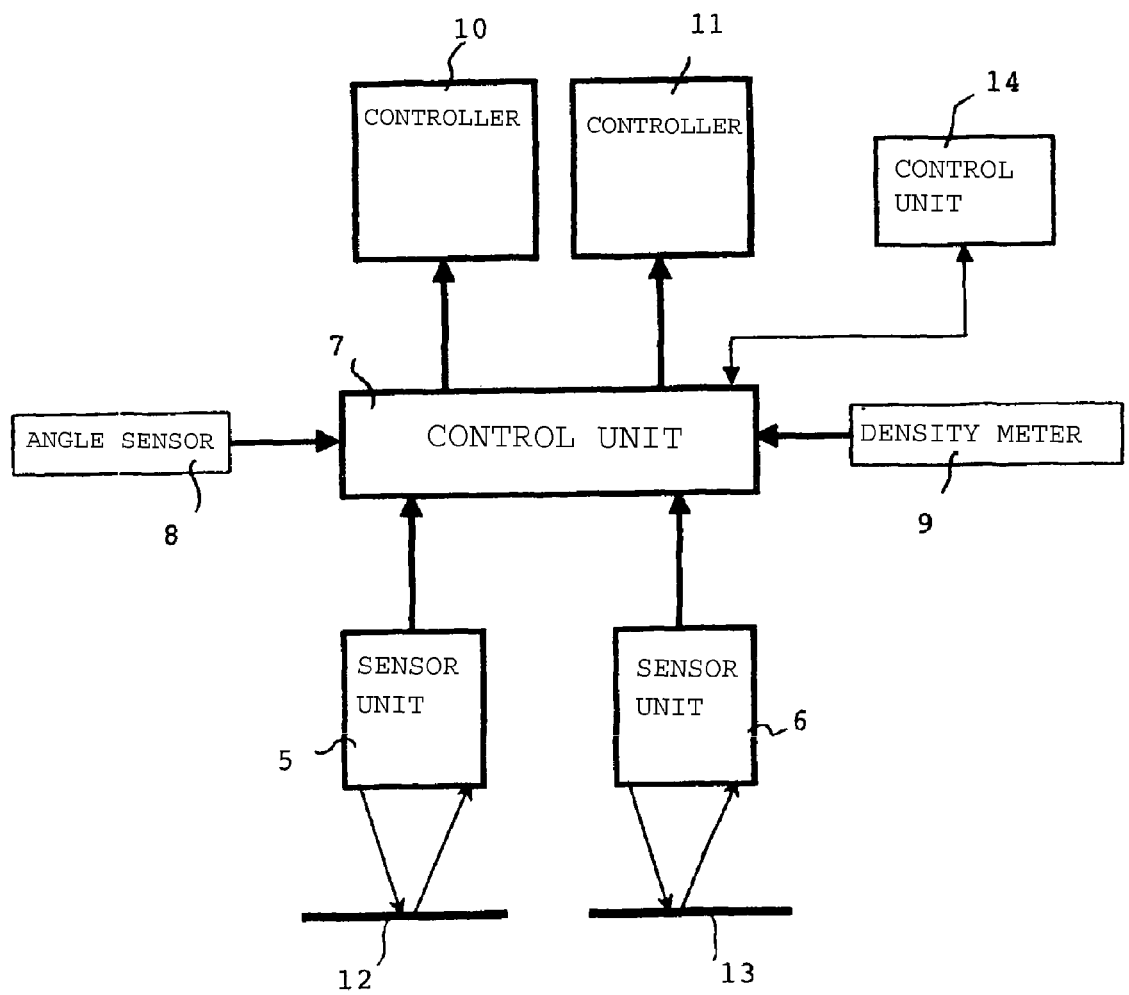
FIG. 2 is a block diagram showing the method according to the invention used at a printing press.

FIG. 2 shows an example of a system according to the Invention used at a printing press. This embodiment comprises two sensor units 5, 6, each having an IR radiator and an IR detector. In this case the IR light may be sent more or less in parallel. In the shown example one of the sensor units 5 is directed to a non-printing area 12 of the printing plate and the other sensor unit 6 is directed to a printing area 13 of the printing plate 3. In the non-printing area 12 the thickness of the fountain solution is measured, In the printing areas the fluid film 4 consists of an emulsion of fountain solution and printing ink and the proportion of printing ink in the emulsion is determined. To calculate the proportion of printing ink in the emulsion the thickness of the fountain solution, as measured by the sensor unit 5 is employed The signals from the detector of each sensor unit 5, 6 are forward to a control unit 7. Normally the control unit 7 communicates with an existing control unit 14 of the printing press. Signals from an angle sensor 8 and a density meter 9 are also transferred to the control unit 7. The angle sensor 8 is used to establish the position of the printing plate 3 and, thus, the point to be measured. The density meter 9 is used for measurement on the printed paper and gives an indication of the printing quality. The control unit 7 sends signals to a controller 10 for fountain solution and a controller 11 for printing ink. Based on the information forward to the control unit 7, it will send signals to the controller 10 for fountain solution and/or the controller 11 for printing ink to increase or decrease the supply of fountain solution and printing ink, respectively, if necessary.

Before starting the actual measurements the sensors ire calibrated on an empty printing plate, to adjust the force of the signal. The minimal force to be used is normally the force, which gives a full signal with an empty printing plate.

To start the measurement according to the invention one or more characteristic absorption band for the fluid film 4 is normally first determined. For printing presses the fluid of the fluid film 4 is either a fountain solution or an emulsion of fountain solution and printing ink. The absorption band is to be in the IR range. The determination Of the one or more characteristic absorption band is normally done by a spectral analysis of the fluid of the fluid film 4. Preferably the main absorption band of the fluid film 4 is used. However, a person skilled in the art realises that also other absorption bands of the fluid may be used. Which other absorption bands may reflect separate ingredients of the fluid. Based on this information the IR detector 2 is set to receive radiation in a band around the chosen characteristic absorption band. The band is normally given by means of one or more filters placed on the IR detector 2. The one or more filters may also be placed at the IR radiator 1. The IR radiator 1 is often set to send IR light in a broad range. When the IR light is sent in a broad range the radiator 1 normally does not have to be adjusted, any adjustment is done by changing the filter at the detector 2 or radiator 1. It is also possible to use an IR radiator sending IR light in a narrow range, which narrow range is adapted to the chosen characteristic absorption band.

In stead of using filters to give one narrow band it is possible to use an IR spectrometer (not shown). As is well known an IR spectrometer will give the spectral characteristic of the received IR light. In this respect it could be said that the IR detector 2 forms a part of the IR spectrometer.

Figure 3:
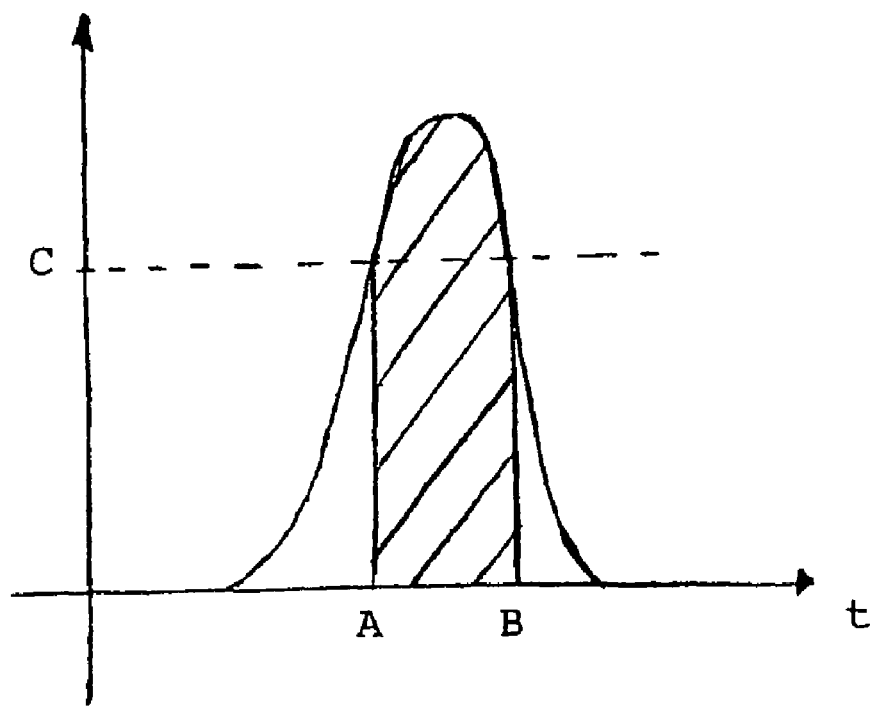
FIG. 3 is a diagram showing one example of how an IR range for measurement may be determined.

In FIG. 3 a method to determine the band in which IR radiation is to be received by the IR detector 2 is indicated. To decide a proper IR band the actual absorption band from the spectral analysis is used. The aim with the method of FIG. 3 is to arrive at a narrow band corresponding to a major part of the actual absorption band. Thus, the absorption farthest out on both sides of the actual absorption band may be discarded. Depending on the form of the actual absorption band a value C being a major fraction of the maximal value in y-direction is chosen. Then the positions A, B on the x-axle related to the value C are determined. The band between the positions A and B is then used as the band in which IR radiation is to be received by the IR detector 2. A person skilled in the art realises that other methods may be used to determine a suitable band of IR light to be received by the detector 2.

When an appropriate absorption band has been determined, the IR radiator 1 and IR detector 2 and/or sensor units 5, 6 are set to measure one or more points in real time. It is also possible to process the signals before the values are presented. It is also possible to use only one of the sensor units 5, 6 to measure on printing and non-printing areas 12, 13, whereby the angle sensor 8 is used to establish the printing area and non-printing area, respectively.

If two or more points are to be monitored simultaneously two or more sensor units 5, 6, containing an IR radiator 1 and an IR detector 2 are used When two or more points are monitored, by two or more sensor units 5, 6, one point is normally a non-printing area 12 and the other point is a printing area 13.

If the two or more points do not have to be monitored simultaneously, one single unit may be used. The single unit will be moved between the points to be monitored so as to measure at each point one at the time in rapid succession. The band of received IR radiation may be altered for each point. Thus, the same unit may be used for measuring alternately at printing areas and non-printing areas. When several points of measurement are monitored, the power of IR radiation in at least one of the points of measurement is set in relation to a specific printing ink.

The measurements are used to constantly control the delivery of fountain solution and printing ink.

It is also possible to show the measurement of the detector 2 or sensor unit 5, 6 locally, i.e. without sending any signals to any control unit 7 of the printing press. In this case the printer may decrease or increase the amount of fountain solution and/or printing ink feed to the printing plate based on the shown measurement values.

The invention claimed is:

1. A method for radiometric measurement of thin fluid films where absorption of IR radiation is used, the method comprising:
   directing at least one IR radiator to send signals to a connected IR detector by means of the fluid film to be measured, wherein the method is used for a printing press and the fluid film comprises fountain solution or an emulsion of fountain solution and printing ink, received on a printing plate;
   wherein several points of measurement are monitored and the power of IR radiation in at least one of the points of measurement is set in relation to a specific printing ink.

2. The method according to claim 1, wherein the printing press is an offset press.

3. The method according to claim 1, wherein the proportion of ingredients of the emulsion of fountain solution and printing ink is measured and the measurement is related to measurement of the thickness of the fluid film, the fluid film being constantly monitored, the supply of fountain solution and or printing ink being adjusted in view of the measurements.

4. The method according to claim 1, wherein the signals from the at least one IR detector are supplied to a control unit.

5. The method according to claim 4, wherein signals of an angle sensor and a density meter are given to the control unit and the signals from related detectors, sensors and meters are processed in the control unit to control the supply of fountain solution and/or printing ink.

6. The method according to claim 5, wherein the signal is pulsated or continuous, the measurements are presented in real time or after processing of the measurements, the IR radiator sends IR radiation in a broad or narrow range, one or more filters are placed at the IR detector or IR radiator to limit the received IR radiation to a band and the absorption band is the main absorption band of the fluid to be measured.

7. The method according to claim 1, wherein an IR spectrometer is used.

8. The method according to claim 1, wherein a characteristic absorption band of the fluid of the fluid film is first determined and the wavelength of the IR radiation to be received by the IR detector is set to a band in a range where the fluid or separate ingredients of the fluid has significant absorption.

9. The method according to claim 8, wherein the characteristic absorption band is determined by means of spectral analysis and the IR range set to be received by the IR detector corresponds to a major part of the chosen characteristic absorption band of the fluid.

10. A device for radiometric measurement of thin fluid films where absorption of IR radiation is used, comprising:
    at least one unit comprising an IR radiator and an IR detector;
    a signal processing system and other support systems provided at a printing press, wherein the at least one unit measures on a non-printing area and a printing area of the printing plate;
    a control unit for receiving information from further sensors or meters;
    wherein several points of measurement are monitored and the power of IR radiation in at least one of the points of measurement is set in relation to a specific printing ink.

11. The device according to claim 10, wherein the at least one unit is fixed or movable.

12. The device according to claim 11, wherein the at least one unit comprises an IR spectrometer.

13. The device according to claim 10, wherein the measurements are presented locally.

14. The device according to claim 10, wherein a separate unit is used for each point of measurement.

15. The device according to claim 10, wherein controllers for delivery of fountain solution and printing ink are connected to the control unit.

* * * * *